(12) United States Patent
Gentry et al.

(10) Patent No.: US 6,189,904 B1
(45) Date of Patent: Feb. 20, 2001

(54) VEHICLE WHEEL SUSPENSION WITH TRANSVERSE LEAF SPRING AND MOUNTS PROVIDING A HIGH ROLL RATIO

(75) Inventors: Johnny Ray Gentry, Kettering; Jason J. Tao; Bruce Patrick Graham, both of Dayton, all of OH (US); Laurent Lasserre, Survilliers (FR); Thierry Annequin, Fleurines (FR); Jean-Marc Blancher, Boissy l'Aillie (FR); Olivier M. Derollepot, Paris (FR)

(73) Assignee: General Motors Corporation, Detroit, MI (US)

( * ) Notice: Under 35 U.S.C. 154(b), the term of this patent shall be extended for 0 days.

(21) Appl. No.: 09/174,281

(22) Filed: Oct. 16, 1998

(51) Int. Cl.[7] .................................................. B60G 11/10
(52) U.S. Cl. .......................... 280/124.175; 280/124.134; 267/149; 267/47
(58) Field of Search ...................... 280/124.17, 124.171, 280/124.175, 124.134, 167; 267/148, 149, 47, 52, 51, 246, 247

(56) References Cited

U.S. PATENT DOCUMENTS

| | | | |
|---|---|---|---|
| 4,458,918 | 7/1984 | Rumpel et al. | 280/124.143 |
| 4,768,807 | 9/1988 | McGibbon et al. | 280/719 |
| 4,771,997 | * 9/1988 | Haldenwanger et al. | 267/149 |
| 4,969,633 | * 11/1990 | Ryan | 267/47 |
| 4,969,634 | * 11/1990 | Bellingham | 267/52 |
| 5,141,209 | 8/1992 | Sano et al. | 267/36.1 |
| 5,826,896 | * 10/1998 | Baumann | 280/124.171 |

* cited by examiner

Primary Examiner—Michael Mar
Assistant Examiner—Lynda Jasmin
(74) Attorney, Agent, or Firm—Robert M. Sigler

(57) ABSTRACT

A vehicle wheel suspension has a composite, transversely oriented, leaf spring which is vertically thick and stiff in end regions extending inward from each end of the spring past the vehicle body support area but is vertically thin and compliant in a middle region between the end regions. The spring is constructed of a long, longitudinally aligned fiber and resin composite which is split at each outer end of the middle region into upper and lower horizontal layers separated by a core having a tapered inner end and extending through the end region. The inserts provide the additional vertical thickness in the end regions without widening the middle region and may be made of a different material, such as a short, randomly oriented fiber and resin composite. The spring thus flexes easily in the heave mode, in which the thin middle region of the spring flexes vertically in opposition to each end. But the center of the spring resists flexing in the roll mode, in which the ends of the spring move vertically in opposition to each other and the spring attempts to flex in the thick end regions. The spring thus provides a high spring rate in roll with a low spring rate in heave for a high roll ratio. The flexing of the spring in the middle, and thus the roll ratio, is additionally enhanced by providing pivoting and longitudinally translating body mounts for the spring. Two specific mount structures are described: a hybrid mount in which mount members above and below the spring each comprise a high modulus member with a rounded surface adjacent the spring affixed to a low modulus member providing longitudinal compliance, and a link mount providing pairs of fore and aft links pivoted at both the spring and body ends.

7 Claims, 3 Drawing Sheets

US 6,189,904 B1

VEHICLE WHEEL SUSPENSION WITH TRANSVERSE LEAF SPRING AND MOUNTS PROVIDING A HIGH ROLL RATIO

TECHNICAL FIELD

The technical field of this invention is a vehicle wheel suspension and particularly such a suspension using a transverse leaf spring.

BACKGROUND OF THE INVENTION

A transverse leaf spring suspension, particularly using a composite leaf spring such as the fiberglass Liteflex® spring manufactured by Delphi Automotive Systems, can provide mass and space reduction in a vehicle wheel suspension. Such a suspension provides a single, transversely oriented leaf spring to provide both heave and roll compliance for a pair of wheels: one on each side of the vehicle. It is generally desirable that the ratio of spring rates in the roll and heave modes (roll ratio) be high, so that the suspension provides resistance to vehicle body roll in turns while remaining compliant in vertical motion to avoid harshness in ride. If a transverse leaf spring is used, each of these often conflicting goals must be addressed in the same spring.

The suspension apparatus of this invention is an improvement over the apparatus shown in U.S. Pat. No. 4,768,807 to McGibbon et al, in which a standard composite leaf spring of uniform cross-sectional area is supported by a pair of mounts having pivot studs projecting fore and aft from a retainer clamped on the spring into a receptacle on a vehicle body cross member to provide a pivoting support with respect to the vehicle body. The pivoting mount of McGibbon et al reduces restriction on the flexing of a leaf spring in heave mode but still provides some restriction due to its low longitudinal translation compliance. In addition, it is complicated to manufacture, due to the necessity of the pivot axis being aligned with the spring shear axis.

SUMMARY OF THE INVENTION

The suspension of this invention provides improvements to both the spring and the mounts of the prior art, which improve the roll ratio individually and in combination. The suspension comprises a composite, transversely oriented, leaf spring which is vertically thick and stiff in end regions extending inward from each end of the spring past the vehicle body support area but is vertically thin and compliant in a middle region between the end regions. This spring thus flexes easily in the heave mode, in which the thin middle region of the spring flexes vertically in opposition to each end. But the center of the spring resists flexing in the roll mode, in which the ends of the spring move vertically in opposition to each other and the spring attempts to flex in the thick end regions including the body support area. The spring thus provides a high spring rate in roll with a low spring rate in heave for a high roll ratio.

Preferably, the spring is constructed of a long, longitudinally aligned fiber and resin composite which is split at each outer end of the middle region into upper and lower horizontal layers separated by a core having a tapered inner end and extending through the end region. The inserts provide the additional vertical thickness in the end regions without widening the middle region and may be made of a different material, such as a short, randomly oriented fiber and resin composite.

The roll ratio is preferably additionally enhanced by providing pivoting and longitudinally translating body mounts for the spring; and two specific structures for such mounts are described herein. The pivoting body mounts permit the greatest possible central flexure of the spring in heave mode, without introducing any increase in compliance in roll mode.

DESCRIPTION OF THE PREFERRED EMBODIMENT

Figure 1:
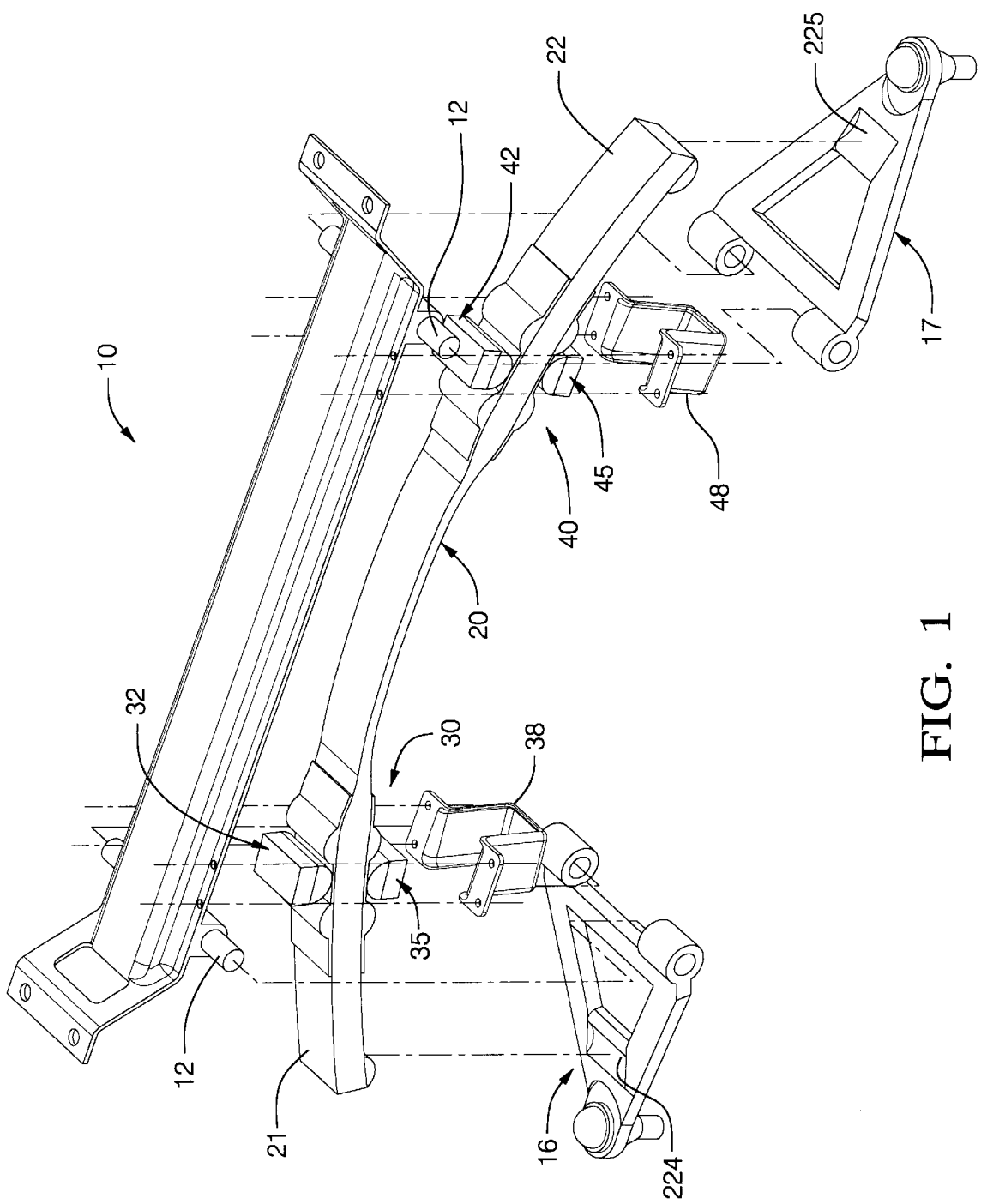
FIG. 1 is an exploded view of a first embodiment of the invention using hybrid body mounts.

Referring to FIG. 1, a sub-frame cross member 10 is transversely incorporated in a sprung body structure of a motor vehicle. Cross member 10 has well known structure 12 on each end for pivotally supporting the inboard ends of lower control arms 16 and 17, the outboard ends of which may be coupled by ball joints to the lower ends of knuckles, not shown, which rotatably support vehicle wheels, not shown, in a standard manner. The knuckles and wheels comprise unsprung wheeled suspension members which are constrained by lower control arms and an upper control arm or other members, not shown, to move generally vertically. The structure described above is well known in the art of vehicle suspension design.

A leaf spring 20 has ends 21 and 22 which are supported in depressions 224 and 225 respectively, of lower control arms 16 and 17, respectively. Spring 20 is further supported on the under side of cross member 10 by a pair of mounts 30 and 40. Mount 30 comprises a mount member 32 above spring 20, a mount member 35 below spring 20 and a bracket 38 affixed to cross member 10 and firmly retaining mount members 32 and 35 in contact with spring 20. Similarly, mount 40 comprises a mount member 42 above spring 20, a mount member 45 below spring 20 and a bracket 48 affixed to cross member 10 and firmly retaining mount members 42 and 45 in contact with spring 20.

Figures 3, 4:
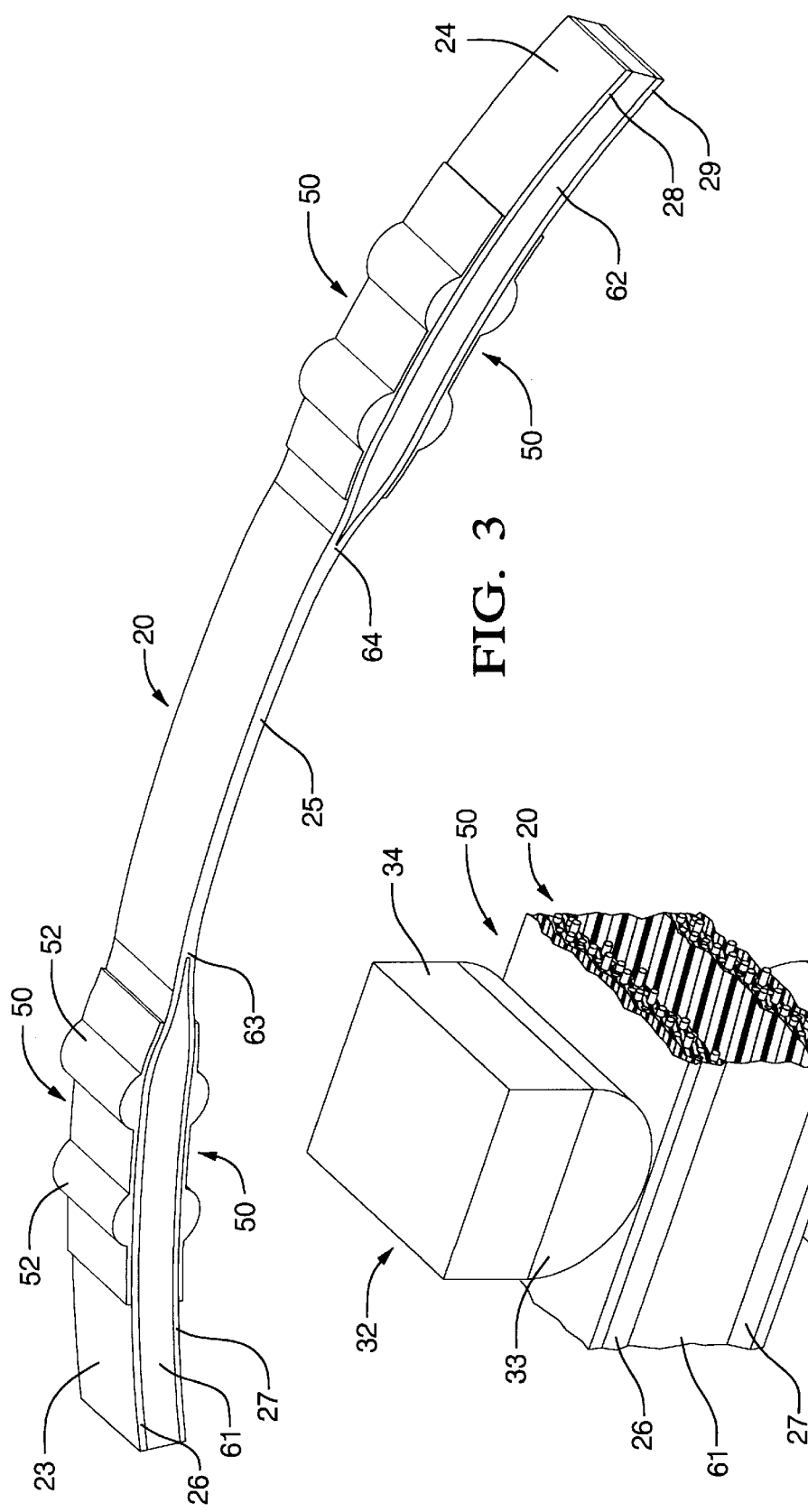
FIG. 3 is a perspective view of a spring for use in the embodiment of FIG. 1.
FIG. 4 is an enlarged view of a hybrid body mount for use in the embodiment of FIG. 1.

Mount members 32 and 35 of mount 30 are shown enlarged in FIG. 4. Each comprises a high modulus portion (33, 36) adjacent spring 20 and a low modulus portion (34, 37) adjacent cross member 10 or bracket 38, respectively. The high modulus portions have curved, convex surfaces adapted for rolling contact with the surface of spring 20 and are sufficiently dense and strong to maintain those surfaces under load. The low modulus portions are more compliant vertically for isolation and laterally for longitudinal translation. A dual density mount member may be made of a single material, such as urethane, having high and low modulus portions. Alternatively, the separate portions of the mount member may be made of separate materials bonded together. An example of the latter is a nylon or polycarbonate high modulus member affixed with an epoxy adhesive to a low modulus rubber member, with the nylon high modulus member being treated, such as by plasma treating, to facilitate the adhesive bonding. Member 40 is similarly constructed.

FIG. 3 shows spring 20 with further apparatus adapted for the hybrid mount of FIGS. 1 and 4. Wherever one of the mount members 32, 35, 42, 45 contacts spring 20, a wear reducing pad 50 is preferably provided on spring 20 to reduce wear and prevent damage thereto. Pads 50 may also be provided with containment bumps 52 as shown to help control lateral movement of spring 20.

Spring 20 has three regions, as shown in FIG. 3. From each end, spring 20 has a substantial vertical thickness through an end region 23, 24. The end regions 23, 24 extend somewhat past the body support area where mounts 30 and 40 are affixed and provide a stiff spring rate therein. A middle region 25 of spring 20 joins end regions 23 and 24 and has a comparatively thin vertical thickness, which is much more vertically compliant. Thus, the structure of spring 20 provides a lower spring rate in middle region 25 for easier flexure and a higher spring rate in the end regions 23 and 24 for more stiffness and less flexure therein. Purely vertical (heave) motions of the vehicle body tend to move the middle of the spring in opposition to the ends thereof. Thus, heave motions of the vehicle body tend to produce flexure in the middle region 25 of spring 20, where it is most compliant. This provides a softer, more comfortable ride. Roll motions of the vehicle body, on the other hand, cause the ends of spring 20 to move vertically in opposition to each other. The forces induced in the spring from the oppositely moving ends tend to cancel in the middle and produce flexure in the end regions 23 and 24. But these regions are much less compliant, due at least in part to the increased thickness. Thus, the spring rate in roll is much higher.

The roll ratio of spring 20, as previously stated, is the ratio of the spring rates in roll and heave modes:

Roll ratio=(roll rate)/(heave rate).

A high roll ratio is desired; and this can be obtained by increasing the roll rate (stiffer), decreasing the spring rate (more compliant) or both. With the structure described above, spring 20 provides increased stiffness in roll mode without a corresponding loss in compliance in heave mode, and thus increases the roll ratio. Finite element analysis indicates that, even with standard, fixed body mounts, spring 20 can achieve a roll ratio of 3.0, which is significantly better than the roll ratio of a standard composite leaf spring of constant cross-section and slightly better than a composite leaf spring of standard construction which has been vertically thinned (and widened) in the middle region.

The roll ratio is increased even further by the use of the pivoting and translating mounts 30 and 40. If spring 20 were clamped firmly to the vehicle body with fixed mounts, the pivoting motion of end regions 23 and 24 required for full flexure of the middle region 25 of spring 20 in heave motion would be constrained. But with spring 20 allowed to pivot in mounts 30 and 40 by the rounded, high modulus portions, heave motions of the vehicle body produce full flexure at the middle region 25 of spring 20, where it is most compliant. In addition, flexure of spring 20 produces a slight longitudinal variation in the length of the spring between the mounts, which would also tend to constrain spring flexure in middle region 25 if the mounts prevented such longitudinal movement. But the compliant, low modulus portions of hybrid mounts 30 and 40 allow the required small, longitudinal translations. The relatively unconstrained flexure of spring 20 in its middle region 25 which results from the pivoting and translating of hybrid mounts 30 and 40 significantly decreases the spring rate in heave mode but has little effect in roll mode; and the roll ratio is thus increased.

The thickened end regions 23 and 24 of spring 20 are provided by a unique construction. A normal composite leaf spring of the prior art comprises continuous and unidirectional fibers of glass, graphite, boron or another suitable material supported longitudinally in a resin and is constrained by standard manufacturing techniques to have a constant cross-sectional area throughout its length. Thus, a vertically thinner middle region would also be horizontally wider; and this places a practical limit on the vertical thickness ratio between the middle and end regions of the spring. But spring 20 herein splits the normal spring construction horizontally at each end into upper and lower layers (26, 27 respectively in end region 23 and 28, 29 respectively in end region 24) separated by a core 61 between layers 26 and 27 and a core 62 between layers 28 and 29. Cores 61 and 62 may be made of any suitable material which will maintain the vertical thickness through the end region under load. The material must bond well to the outer layers and resist shear in bending, both at the material interface and internally. These properties must clearly persist throughout the normal range of expected temperatures and other environmental conditions. For example, a fiber filled resin composite using short, randomly oriented fibers may be used. Springs having somewhat varying properties may be made by varying the length or material of the fibers as well as the specific resin. Preferably, cores 61 and 62 have tapered inner ends 63 and 64, respectively.

Figure 2:
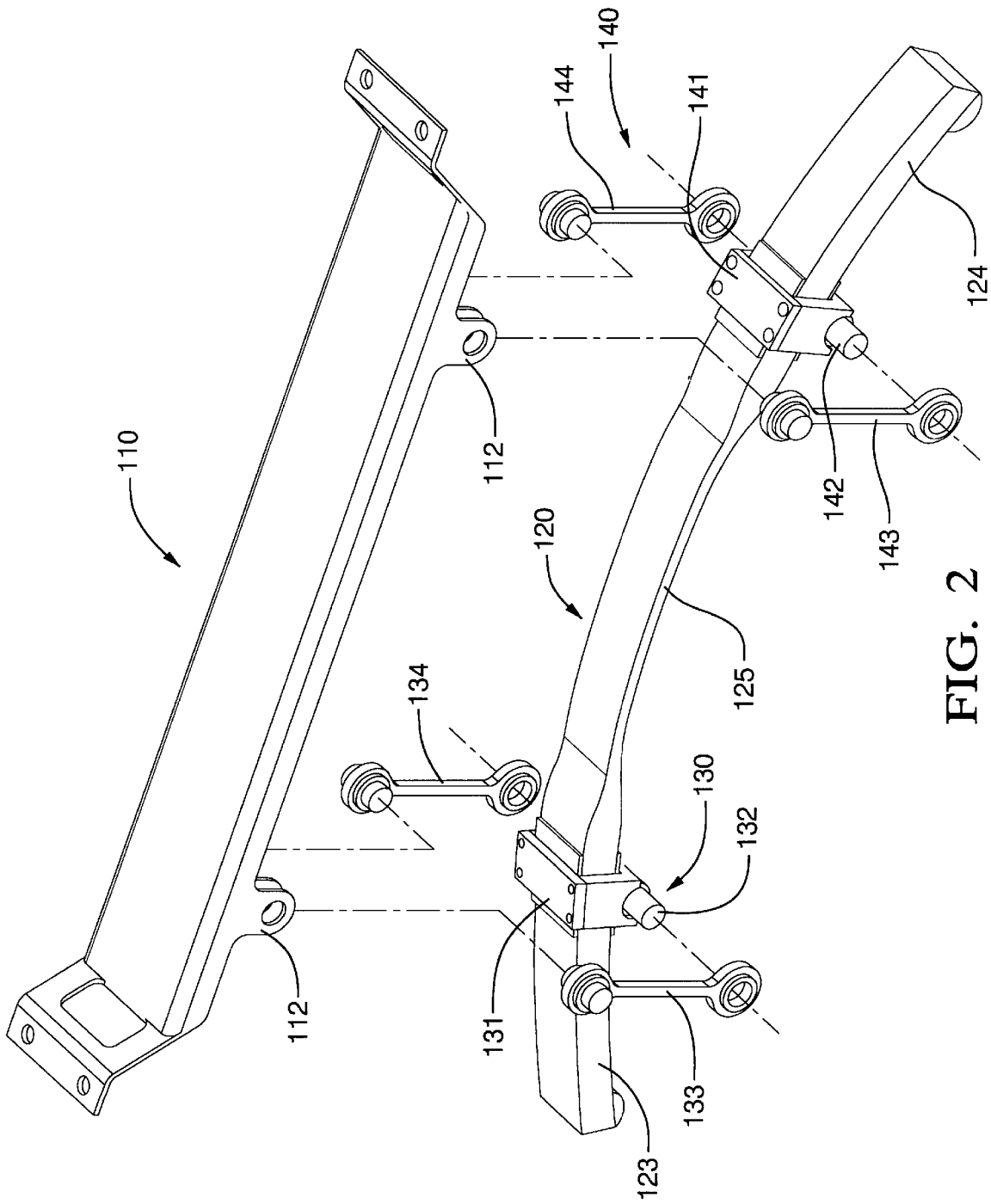
FIG. 2 is an exploded view of a second embodiment of the invention using linking body mounts.

A second embodiment of the invention is shown in FIG. 2. This embodiment uses a similar spring 120 but provides a different form of pivoting and translatable mount. Spring 120 has the same basic shape and construction as spring 20 of FIG. 3 and in fact may be identical, except that the pads 50 with bumps 52 are not used. A vehicle body cross-member 110 is provided with pivoting mounting structure 112 inward of each end. Spring 120 is provided with mounts 130 and 140 each comprising a rectangular clamping member 131, 141 respectively around the spring. Members 131 and 141 are similar to prior art mounts, including the use of standard isolating pads 150 between members 131 and 141 and the horizontal surfaces of spring 120, with one exception: pins 132 and 142 project horizontally outward from the front (shown) and rear (not shown) of the members 131 and 141, below spring 120.

Each of mounts 130 and 140 finally comprises a pair of links (133, 134 and 143, 144, respectively) pivotally coupled at the upper end to mounting structure 112 of cross-member 110 with a common upper pivot axis and at the lower end to pins 132 and 142, respectively of mounts 130 and 140 with a common lower pivot axis parallel to the upper pivot axis. Links 133, 134, 143, 144, pivoting at both the spring end and body end, provide the pivoting and longitudinal translation required for full flexure of spring 120 in heave mode and thus a high roll ratio, perhaps even more than that of the apparatus of FIG. 1. Finite element analysis indicates a roll ratio as high as 7.1 for the apparatus of FIG. 2. As an additional advantage, the structure of this mount allows the pivot axis of spring 120, defined by the axis of pins 132 (or 142), to be located freely with respect to the shear axis of the spring. In the prior art U.S. Pat. No. 4,768,807 mentioned previously, the pivot axis of the spring was constrained to be in alignment with the shear axis of the spring. In the mount of FIG. 2 described herein, the pivot axis is below the spring, which permits a more compact packaging of the suspension. In addition, it allows a simpler construction of member 131, in which pins 132 may be embodied in a single member affixed to, and projecting both fore and aft from, the bottom of a rectangular bracket (likewise for member 141 and pins 142). Furthermore, each pair of links (133, 134 and 143, 144) could be joined into a single linking member, if desired.

What is claimed is:

1. A wheel suspension for a motor vehicle having a sprung body member between a pair of unsprung wheeled suspension members, the suspension comprising, in combination:

a leaf spring oriented transversely across the vehicle body member and coupled at each end to one of the unsprung wheeled suspension members, the leaf spring having an end region extending inwardly from each end thereof and joined by a middle region, the leaf spring being vertically thin and compliant in the middle region and vertically thick and stiff in each end region; and a pair of body mounts coupling the leaf spring to the sprung body member in a pivoting and longitudinally translating manner in spring support areas within the end regions inboard of the ends of the leaf spring.

2. The suspension of claim 1 in which the leaf spring has a longitudinal member comprising a plurality of continuous and unidirectional fibers in a resin composite forming a vertically thin and compliant middle region, the longitudinal member being split at each end of the middle region into a pair of horizontal layers separated vertically by a core comprising a different material producing thick and stiff end regions extending from each end of the middle region, the middle and end regions being of substantially the same horizontal width.

3. The suspension of claim 1 in which at least one of the body mounts comprises a pair of mount members, one below the spring and the other above the spring, each of the mount members comprising a low compliance portion having a convex, curved surface against the spring allowing rolling movement therebetween and a high compliance portion in contact with the body allowing longitudinal translation therebetween, whereby flexure of the spring in heave mode is facilitated.

4. The suspension of claim 1 in which at least one of the body mounts comprises, in combination:

a pair of clamping members affixed to the spring, each of the clamping members having axially aligned pins extending fore and aft therefrom and defining a pivot axis; and a linking apparatus coupled at one end pivotally to the axially aligned pins of one of the clamping members and at the other end pivotally to the vehicle body member, the linking apparatus permitting essentially unrestricted rotation of the spring about the pivot axes and longitudinal translation of the pivot axis, whereby flexure of the spring in heave mode is facilitated.

5. The suspension of claim 4 in which the linking apparatus comprises a pair of links, fore and aft the spring and pivoting at the spring end in a first common axis and at the body end in a second common axis, the first and second common axes being parallel to each other.

6. A mount for coupling a transverse leaf spring to a body member in a wheeled vehicle suspension, the mount comprising a pair of mount members, one below the spring and the other above the spring, each of the mount members comprising a first portion made substantially of a low compliance material and having a convex, curved surface against the spring allowing rolling movement therebetween and a second portion made substantially of a high compliance material in contact with the body allowing longitudinal translation therebetween, whereby flexure of the spring in heave mode is facilitated.

7. A leaf spring for a wheeled vehicle suspension having a longitudinal member comprising a plurality of continuous and unidirectional fibers in a resin composite forming a vertically thin and compliant middle region, the longitudinal member being split at each end of the middle region into a pair of horizontal layers separated vertically by a core comprising a different material producing thick and stiff end regions extending from each end of the middle region, the middle and end regions being of substantially the same horizontal width, the spring thus providing a high roll ratio for a wheeled vehicle when supported at longitudinal ends of the longitudinal member on unsprung wheel members of the vehicle with a body of the wheeled vehicle supported on the end regions of the longitudinal member inboard of the longitudinal ends thereof.

* * * * *